United States Patent [19]

Rusinov et al.

[11] 4,390,249
[45] Jun. 28, 1983

[54] GALILEAN-TYPE TELESCOPE SYSTEM

[76] Inventors: Mikhail M. Rusinov, naberezhnaya Fontanki, 139, kv. 36; Galina N. Judova, ulitsa Avtovskaya, 2, kv. 5; Jury V. Kudryashov, prospekt Piskarevsky, 39, kv. 34; Peisakh Y. Agurok, Grozhdansky prospekt, 130, korpus 4, kv. 8, all of Leningrad, U.S.S.R.

[21] Appl. No.: 197,758

[22] Filed: Oct. 16, 1980

[51] Int. Cl.³ ................ G02B 23/00; G02B 9/12
[52] U.S. Cl. ........................................... 350/453
[58] Field of Search ......................... 350/453, 477

[56] References Cited

U.S. PATENT DOCUMENTS 3,663,094  5/1972  Bertele .......................... 350/453

FOREIGN PATENT DOCUMENTS 175270  11/1965  U.S.S.R.
201716  11/1967  U.S.S.R. ........................ 350/453

Primary Examiner—John K. Corbin
Assistant Examiner—P. M. Dzierzynski
Attorney, Agent, or Firm—Lilling & Greenspan

[57] ABSTRACT

A Galilean-type telescope system comprises three components arranged successively along the optical axis thereof. The first and the second components are single positive menisci, constituting the objective of the system and separated by an air space from the third component, which is a negative concentric meniscus forming an eyepiece of the system, all three components being concave towards the eye side of the system. The third component is a lens member cemented together from two lenses having their cemented surfaces of the same shape and equal refractive indices but different dispersion, the dispersion of the lens disposed closer to said eye side being substantially less than that of the following lens. The thickness of the air space between the second and third components complies with the relationship:

$$d_x = f_1\left(1 - \frac{1}{\Gamma}\right) - R_x,$$

wherein:
$d_x$—thickness of the air space,
$f'_1$—rear focal distance of the objective,
$\Gamma$—magnification provided by the system,
$R_x$—radius of curvature of the front refractive surface of the negative concentric meniscus.

8 Claims, 7 Drawing Figures

GALILEAN-TYPE TELESCOPE SYSTEM

FIELD OF THE INVENTION

The present invention relates to optical systems, and more particularly to Galilean-type telescope systems.

The present invention has still more particular reference to Galilean-type telescope systems providing comparatively low magnification.

The present invention can be used for manufacturing opera glasses and binoculars.

BACKGROUND OF THE INVENTION

When optical instruments with low magnification are designed, particularly for men with hypoacuity, one of the emerging problems is to provide a comparatively wide field of view along with the adequate quality of the obtained image, i.e. the image should be distinct sharp, colourless etc.

Telescopic optical systems used at present in such optical instruments have an angle of view which does not exceed, as a rule, 17 degrees. Moreover, most of these optical instruments are heavy and are not comfortable enough in use. The present invention is directed at making the optical instruments of low magnification more comfortable in use and at improving the parameters of telescopic optical systems applied therein.

DESCRIPTION OF THE PRIOR ART

Known in the art is a Galilean-type telescope system (cf., U.S.S.R. Inventor's Certificate No. 175,270 published Sept. 21, 1965) comprising two components arranged successively along the optical axis of this system in the direction of the light beam. In this optical system the first component is a positive meniscus whose front convex refractive surface faces the object of vision or, in other words, the object side of this optical system is elliptical and the rear concave refractive surface is spherical, the positive meniscus being a lens member cemented together from two lenses having considerably different refractive indices. The second component of the telescope system is a negative concentric meniscus whose front convex and rare concave refractive surfaces are spherical. Both menisci of this optical system are concave towards the eye of the observer or, in other words, towards the eye side of the optical system. Such optical system provides, along with a certain magnification, the correction of astigmatism along the whole field of view.

However, this system fails to provide a sufficiently wide angle of view, both optical components therein being represented as comparatively thick lenses of large diameter, which are required to correct aberrations, but make the optical instrument wherein such optical system is applied rather uncomfortable in use due to the comparatively large overall dimensions and mass thereof. Besides, an aspheric shape of the front convex refractive surface of the lens of the first component complicates to a certain extent the manufacturing process of this lens due to the fact that commercial lens-grinding machines are not suitable for such purpose which consequently complicates the process of manufacturing and raises the price of mass production of the optical instruments wherein the aforesaid telescopic optical system is applied.

There is also known a Galilean-type telescope system (cf. U.S.S.R. Inventor's Certificate No. 201716, published Sept. 8, 1967), comprising three components arranged along the optical axis of this system in the direction of the light beam. The first component is represented as a single positive meniscus, the second component is a positive meniscus in the form of a lens member cemented together from two lenses having different refractive indices, and the third component is a negative concentric meniscus separated from the second component by an air space, the first and the second components forming the objective of the optical system and the third component being an eyepiece of the optical system. All three components of said optical system have spherical refractive surfaces and are concave towards the eye side of this system. Correction of the field and chromatic aberration in such telescope system is produced in the objective.

However, inspite of the fact that in this known Galilean-type telescope system the product of the magnitude of the angle of view (equal to 24°) by the magnitude of visible magnification is greater than that in the afore described telescope system, it accommodates rather thick lenses with high refractive indices to correct the abovementioned aberrations and the spherical aberrations of the axial and oblique light beams, these lenses having sufficiently large diameter and being therefore comparatively heavy. As a result of this, the mass and dimensions of the optical instrument wherein such optical system is applied are still large, similar to the first optical system described hereabove.

Besides, the air space between the second and the third components in this system is too small to provide the focusing of the eyepiece according to the eye of the wearer.

SUMMARY OF THE INVENTION

It is an object of the present invention to simplify the Galilean-type telescope system of low magnification, while retaining the adequate quality of the image.

Another object of the present invention is to provide a Galilean-type telescope system having a wider angle of view.

A further object of the present invention is to provide a Galilean-type telescope system which enables the manufacturing process of lenses constituting this system to be simplified.

Still another object of the present invention is to provide a Galilean-type telescope system with reduced mass.

Still another object of the present invention is to provide a Galilean-type telescope system with smaller dimensions.

Still another object of the present invention is to provide a small telescope system wherein an eyepiece can be focused according to the eye of the wearer.

With these and other objects in view, there is provided a Galilean-type telescope system comprising three optical components arranged successfully along the optical axis of this system in the direction of the light beam. The first component is a single positive meniscus, the second component is a positive meniscus and the third component is a negative concentric meniscus separated from the second component by an air space, the first and the second components forming an objective of the optical system, the third component being an eyepiece of the optical system, and all three said components being concave towards the eye side of this optical system. According to the invention, the second component is made in the form of a single positive meniscus, and the negative concentric meniscus, representing the third component, is made in the form of a lens member cemented together from two lenses having their cemented surfaces of the same shape and essentially equal refractive indices but different dispersion, the dispersion of the lens disposed along the optical axis closer to the eye side of this optical system being substantially less than that of the following lens and the thickness of the air space in the optical axis separating the third component from the second component being in compliance with the following relationship:

$$d_x = f'_1\left(1 - \frac{1}{\Gamma}\right) - R_x,$$

wherein:
- $d_x$—thickness of the air space in the optical axis,
- $f'_1$—rear focal distance of the objective of this optical system,
- $\Gamma$—magnification provided by this optical system,
- $R_x$—radius of curvature of the front refractive surface of the negative concentric meniscus.

Due to the fact that in the herein-proposed telescope system the negative concentric meniscus adapted as an eyepiece of this system is made in the form of the lens member cemented together from two lenses of said dimensions, the correction of the image defects caused by the chromatic aberration is produced in the eyepiece. This made it possible to choose for the lenses of the menisci of the objective the lenses with low refractive indices, i.e. the lenses lighter by weight and allowed to make all the menisci of the optical system thinner and of less diameter.

In one embodiment, the cemented surfaces of the lenses of the negative concentric meniscus are planes.

Such shape of the cemented surfaces simplifies the manufacture of the lenses of the negative concentric meniscus.

In the other embodiment, the cemented surfaces of the lenses of the negative concentric meniscus are made spherical with an equal radius of curvature, their concaves being towards the eye side of this optical system.

Such shape of the cemented surfaces simplifies the correction of the chromatic aberration in this optical system which will be described in more detail hereinafter.

BRIEF DESCRIPTION OF THE ACCOMPANYING DRAWINGS

These and other features and advantages of the present invention will appear more clearly from the following description used to illustrate preferred embodiments of the invention with reference to the accompanying drawings in which.

DETAILED DESCRIPTION OF THE INVENTION

Figure 1:
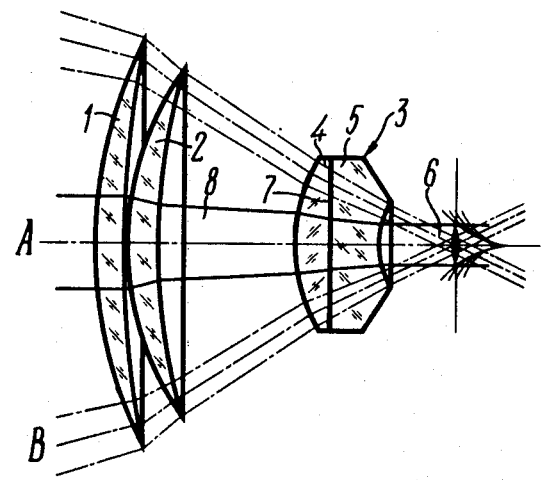
FIG. 1 is a schematic view, illustrating a Galilean-type telescope system according to the invention.

Referring more particularly to the accompanying drawings, FIG. 1 best illustrates the proposed Galilean-type telescope system used in small-dimentioned opera glasses, comprising three optical components arranged successively along an optical axis of this system in the direction of the travel therethrough of an axial bundle A of light or an oblique bundle B of light. The first component is a rather thin single positive meniscus 1 having a relatively low ratio of the thickness in the optical axis to the diameter thereof not exceeding 1:10. The second component is also a rather thin single positive meniscus 2 having, however, a greater relationship of the thickness to the diameter thereof because its diameter is a bit less (approximately by 10%) than that of the single positive meniscus 1 on account of the direction of the oblique bundle B of light. The single positive menisci 1 and 2 are constituted of lenses with equal refractive indices and dispersion factors. The third component is a negative concentric meniscus 3 made in the form of a lens member cemented together from two thinner lenses 4 and 5 having different dispersion but substantially equal refractive indices which provides correction of chromatic aberration. In each of said menisci 1, 2 and 3 the front convex and the rear concave refractive surfaces are spherical, all these three menisci being concave towards the eye side 6 of the aforementioned system wherein, as it is shown in FIG. 1, the eye of the observer is placed.

The single positive menisci 1 and 2, arranged close to each other with a clearance not more than 0.1 mm, constitute an objective of this optical system having a positive focal distance. In each of the single positive menisci 1 and 2 the radius of the rear refractive surface is greater than that of the front refractive surface, the radii of the front refractive surfaces of each of the menisci 1 and 2 being chosen such that each of these surfaces has focal power exceeding the focal power of the whole meniscus embodying this surface, thus making the front refractive surfaces of these menisci to be the surfaces providing the power. The radii of the rear refractive surfaces of each of the single positive menisci 1 and 2 are chosen so as to supply these surfaces with corrective properties. Combination of the aforementioned menisci 1 and 2 in the objective of the described optical system provides the correction of astigmatism and coma therein and alongside with this maintains appriciable negative spherical aberration required to compensate for positive spherical aberration of the eyepiece of this system.

The eyepiece of the proposed telescopic optical system is the negative concentric meniscus 3 cemented together from two lenses 4 and 5 along cemented surfaces 7 which are of the same shape and presented by planes wherein unconcentricity should not exceed 20%. The difference in refractive indices of the lenses 4 and 5 should not exceed 0.05 and the difference in dispersion should not be less than 20, the dispersion of the lens 5 disposed closer to the eye side 6 of the optical system being substantially less than that of the following lens 4.

The negative concentric meniscus 3 is separated from the single positive meniscus 2 by an air space 8 the thickness of which, i.e. the distance between the rear refractive surface of the meniscus 2 and the front refractive surface of the meniscus 3 in the optical axis, complies with the following relationship:

$$d_x = f'_1 \left(1 - \frac{1}{\Gamma}\right) - R_x,$$

wherein
$d_x$—thickness of an air space in the optical axis,
$f'_1$—rear focal distance of the objective of this optical system,
$\Gamma$—magnification provided by this optical system,
$R_x$—radius of curvature of the front refractive surface of the negative concentric meniscus.

This relationship is based on the following consideration. On the one hand, in the telescopic optical system according to the present invention the focal power of the objective constituted by the single positive menisci 1 and 2 and the focal power of the eyepiece represented by the negative concentric meniscus 3 are chosen to be such as to make the relation of the focal distance $f'_1$ of the objective to the focal distance of the eyepiece designated as $f'_2$ equal to magnification provided by this optical system:

$$\Gamma = f'_1/f'_2 \qquad (1)$$

Therefrom:

$$f'_2 = f'_1/\Gamma \qquad (2)$$

On the other hand, the difference between said focal distances should be equal to the sum of the value of the radius $R_x$ of the front refractive surface of the negative concentric meniscus 3 and the thickness $d_x$ of the air space 8 between this meniscus 3 and the single positive meniscus 2, i.e.:

$$f'_1 - f'_2 = R_x + d_x \qquad (3)$$

Wherefrom:

$$d_x = (f'_1 - f'_2) - R_x \qquad (4)$$

Substituting the right part of the relationship (2) into the relationship (4) there obtained after simplification the aforementioned relationship:

$$d_x = f'_1 \left(1 - \frac{1}{\Gamma}\right) - R_x \qquad (5)$$

It is to be noted that it is desirable that the thickness $d_x$ of the air space 8 should also be chosen in accordance with the following expression:

$$d_x > \frac{(f'_2)^2}{1000} K. \qquad (6)$$

wherein K is a proportionality factor characterizing the limits of focusing of the eyepiece in diopters and chosen, generally, to be equal to not less than 3.

The possibility to choose the thickness of the air space in accordance with the relationships (5) and (6) obtained thereabove allows to change in a sufficiently wide range the convergence of the bundle of light emitting from the eyepiece, i.e. allows to focus the optical system according to the eye of a wearer.

Figure 2:
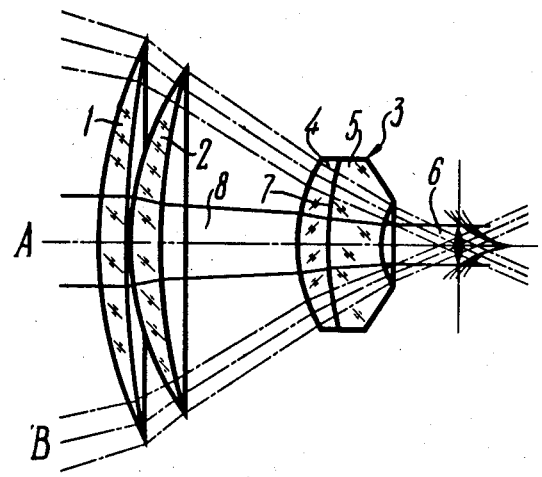
FIG. 2 is a schematic view, illustrating another embodiment of a Galilean-type telescope system according to the invention, wherein the cemented surfaces of the lenses of a negative concentric meniscus are spherical.

In the embodiment of the present invention, as best shown in FIG. 2, the cemented surfaces 7 of the lenses 4 and 5 of the negative concentric meniscus 3 are spherical with an equal radius of curvature and are concave towards the eye side of this optical system. The values of the radii of the cemented surfaces 7 are chosen to be greater than those of the radii of the front and rear refractive surfaces of the negative concentric meniscus 3.

The proposed Galilean-type telescope system operates as follows.

Parallel light beams of the axial bundle A and the oblique bundle B, emitting from the object of observation located at infinity, enter the objective of the optical system, striking the front refractive surface of the positive single meniscus 1 of the objective wherein they are converged by the positive single menisci 1 and 2 at the rear focal plane thereof, constructing the image of the observed object in this plane. During the path of the axial bundle A and oblique bundle B of light through the objective, the menisci 1 and 2 correct the defects of the image produced by field aberrations, in particular, by astigmatism and coma, the defects of the image produced by chromatic aberration being preserved completely, while the defects of the image produced by spherical aberration are only partially preserved.

From the objective the axial bundle A and oblique bundle B travel to the eyepiece, i.e., to the negative concentric meniscus 3. Due to the fact that the meniscus 3 is situated at a certain distance along the optical axis from the meniscus 2 of the objective, the rear focal plane of the objective coincides with the front focal plane of the eyepiece and therefore the bundles A and B of light and entering the meniscus 3 from the objective emanate from the meniscus 3 practically parallel to strike then the eye of the observer, the rotation center of which is matched with the center of the eye side of the optical system.

The negative concentric meniscus 3 used as an eyepiece in this optical system introduces the positive spherical aberration which, however, is completely compensated by the negative spherical aberration introduced by the objective. Referring to the chromatic aberration introduced into the optical system by the objective, it is also completely compensated in the eyepiece due to the fact that the meniscus 3 is made as a lens member cemented together from two lenses 4 and 5 having different dispersion factors and equal refractive indices.

In the case when it is required to focus the optical system according to the peculiarities of the sight of the wearer, the thickness of the air space is changed by moving the negative concentric meniscus 3 along the optical axis in either direction, the maximum change in said thickness being possibly equal to about 6 mm.

The operation of the proposed system according to the embodiment of the present invention shown in FIG. 2 is not different in principle from the operation of the system according to the embodiment of the present invention shown in FIG. 1. However, the embodiment wherein the spherical cemented surfaces 7 of the lenses 4 and 5 of the negative concentric meniscus 3 are applied has certain advantages though the plane shape of the surfaces 7 allow to increase the number of lenses manufactured at one machine. One of the aforementioned advantages lies in the fact that this embodiment allows to provide the predetermined range of correction of the chromatic aberration at a smaller difference in dispersion of the lenses 4 and 5. This is of great practical importance since difficulties are experienced sometimes in choosing among the existing grades of lenses, the lenses with required difference in dispersion and with equal refractive indices.

The Galilean-type telescope system according to the present invention may be realized with the following main dimensions and optical parameters of the components thereof:

radius of curvature of the front refractive surface of the meniscus 1: $R_1 = 50.93$ mm radius of curvature of the rear refractive surface of the meniscus 1: $R_2 = 105.2$ mm radius of curvature of the front refractive surface of the meniscus 2: $R_3 = 34.51$ mm radius of curvature of the rear refractive surface of the meniscus 2: $R_4 = 67.92$ mm radius of curvature of the front refractive surface of the meniscus 3: $R_x = R_5 = 15.101$ mm radius of curvature of the cemented surface 7 of the lenses 4 and 5 of the meniscus 3: $R_6 = 100.0$ mm radius of curvature of the rear refractive surface of the meniscus 3: $R_7 = 7.015$ mm thickness of the meniscus 1 in the optical axis: $d_1 = 4.0$ mm thickness of the meniscus 2 in the optical axis: $d_2 = 4.0$ mm meniscus 1 and meniscus 2 are made of the optical glass of the same grade with the refractive index: $n_{D1} = n_{D2} = 1.613$ thickness of the air space 8: $d_x = d_3 = 13.1$ mm thickness of the front lens 4 of the meniscus 3 in the optical axis: $d_4 = 3.6$ mm refractive index of the lens 4: $n_{D3} = 1.7424$ thickness of the rare lens 5 of the meniscus 3 in the optical axis: $d_5 = 4.49$ mm refractive index of the lens 5: $n_{D4} = 1.7398$ dispersion of the lens 4 (Abbe number): $\nu = 50.4$ dispersion of the lens 5 (Abbe number): $\nu = 28.16$ The proposed Galilean-type telescope system with the aforementioned basic dimensions and optical parameters of the components thereof has the following characteristics:

magnification provided by the optical system: $\Gamma = 2.1$ fold angle of a view of the optical system: $2\omega = 30°$ The quality of the image obtained with the help of the proposed system having aforementioned characteristics is illustrated by the graphs shown in FIGS. 3, 4, 5, 6 and 7.

Figure 3:
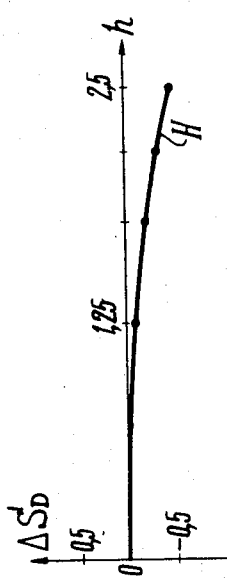
FIG. 3 is a graph showing the value of longitudinal spherical aberration as a function of the height of the eye side of the telescope system according to the present invention.

In the graph of FIG. 3 the curve H illustrates the variation of the longitudinal spherical aberration of said optical system for the object situated in the optical axis thereof at infinity as a function of the height of the eye side of the system, the Y-axis showing the values of $\Delta S^1_D$ of the longitudinal spherical aberrations in diopters and the X-axis showing the values of the height h of the eye side of the optical system in millimeters. As clearly apparent from the curve H, the longitudinal spherical aberration smoothly increases with the increase in the height of the eye side, said aberration not exceeding 0.5 diopters at the rim of the eye side when the height thereof h is equal to 2.5 mm.

Figure 4:
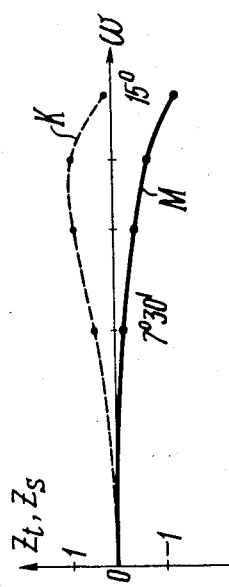
FIG. 4 is a graph showing the value of a meridian and sagittal curvature of an image as a function of the angle of view of the telescope system according to the present invention.

In FIG. 4 the curve K displays the curvature of the image in the meridian plane as a function of the angle of view of said optical system for the case when the observed object is situated aside from the optical axis of the system (see also FIG. 1), while the curve M (FIG. 4) displays the curvature of the image in the sagittal plane as a function of the angle of view of this system under the same conditions, the Y-axis presenting the values of $Z_t$ and $Z_s$ which characterize respectively the curvature of the image in the meridian plane and the curvature of the image in the sagittal plane in diopters, and the X-axis presenting the values of the angle $2\omega$ of view in the angular degrees. As clearly shown by the curves K and M, the curvature of the image both in meridian and sagittal planes smoothly increases with the increase in the angle of view. These diagrams show also that astigmatism in this optical system which is defined by the difference between the meridian and sagittal curvatures is of a low value equal to about 1.5 diopters which is of special importance in the optical instruments designed for observations.

Figure 5:
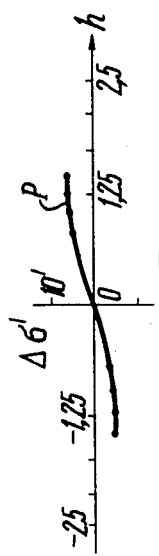
FIG. 5 is a graph showing the value of the lateral spherical aberration as a function of the height of the eye side at a maximum angle of view according to the invention.

In the diagram of FIG. 5 the curve P illustrates the values of spherical aberrations of the proposed system as a function of the height of the eye side of said system for the case when the value of the angle of view is maximum and equals to 30°, the observed object is situated aside from the optical axis of said system and the light beams of the oblique bundle B (see also FIG. 1) travel in the direction of the meridian section of the system, the Y-axis presenting the values $\Delta\sigma'$ of the lateral spherical aberrations in angular minutes, and the X-axis presenting the values of the height h of the eye side of the system in millimeters. It is clearly apparent from the curve P that coma is absent in this optical system and the lateral aberration within the range of the whole height of the eye side of the system is of a small value.

Figure 6:
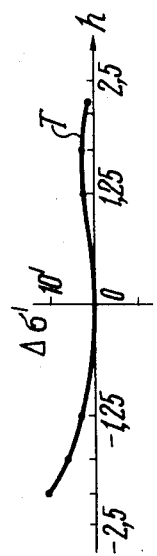
FIG. 6 is a graph similar to that shown in FIG. 5 but with an angle of view less than maximum.

In the diagram of FIG. 6 the curve T illustrates the value of the lateral spherical abberation of this optical system as a function of the height of the eye side at an angle of view equal to 20°, the Y-axis also presenting the values of $\Delta\sigma'$ of the lateral spherical aberrations in angular minutes and the X-axis presenting the values of the height h of the eye side of the system in millimeters.

Figure 7:
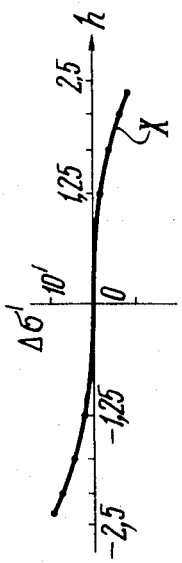
FIG. 7 is a graph similar to that shown in FIG. 5 but with an angle of view equal to zero.

FIG. 7 shows the curve X, illustrating the value of the lateral spherical aberration of this optical system as a function of the height of the eye side thereof at an angle of view equal to zero and for the object of observation situated at an optical axis of this system, the Y-axis also presenting the values $\Delta\sigma'$ of the lateral spherical abberation in the angular minutes, and the X-axis presenting the values of the height h of the eye side of the system in millimeters.

It is apparent from the curves T and X that for these cases also no coma is observed in the proposed system and the lateral spherical aberration is of low value.

The proposed telescope system provides the following advantages in comparison with prior art constructions of similar designation.

On the first hand, the construction of this optical system provides, as it was shown above, a wider field of view alongside with sufficiently adequate quality of the image of the observed object.

On the second hand, the construction of this optical system accommodates optical components of smaller geometrical dimensions and mass. This allows a reduction of the overall dimensions of the optical instruments wherein such optical system is applied, for example, opera glass by at least 15-20%, and allows a reduction of the mass of these instruments by not less than twice retaining the same optical characteristics thereof or even improving them.

On the third hand, the fact that this system accommodates more thin first and second components allowed to enlarge the distance between the eye side of the system and the third component which, in its turn, gave the possibility, on the one hand, to increase the radii of refractive surfaces of this component thus simplifying the manufacturing process thereof and, on the other hand, to provide certain comfort for the wearer, since when the optical instrument is in use, the eye of the wearer is sufficiently far from the eyepiece and the eyelashes of the observer do not brush against the frame of the eyepiece.

At least what makes the proposed optical instrument more comfortable in use is the possibility to focuse the instrument in a sufficiently wide range, i.e. from −3 to +3 deopters.

All this as a whole makes the optical instruments wherein the proposed Galilean-type telescope system will be applied less expensive and at the same time more comfortable in use.

Although the present invention has been described with reference to preferable embodiments thereof, it will be understood by those skilled in the art that different modifications and equivalents may be made in the construction of the proposed system or the elements thereof without departing from the spirit of the invention.

All these modifications are considered to be within the spirit and scope of the invention as defined in the claims below.

What is claimed is:

1. A Galilean-type telescope system having an object side and an eye side, comprising:

first, second and third optical components arranged successively along the optical axis of said system in the direction of the travel of the light beam therethrough, said first component being a single positive meniscus, said second component being a single positive meniscus, and said third component being a negative concentric meniscus, said first and said second components constituting an objective of said telescope system and said third component being an eyepiece of said telescope system, all said three components being concave towards the eye side of said optical system, said negative concentric meniscus, representing said third component, including a lens member having cemented together two lenses with the same shape of cemented surfaces, said lenses of said third component having substantially equal refractive indices but different dispersion, the dispersion of the lens disposed closer to said eye side of said telescope system being substantially less than that of the following lens, and an air space separating said second component from said third component and whose thickness in the optical axis complies with the following relationship:

$$d_x = f_1 \left(1 - \frac{1}{\Gamma}\right) - R_x,$$

wherein:

$d_x$—thickness of the air space in the optical axis of said system, $f'_1$—rare focal distance of said objective of said system, $\Gamma$—magnification provided by said system;

$R_x$—radius of curvature of the front refractive surface of said negative concentric meniscus.

2. A Galilean-type telescope system as set forth in claim 1, wherein said cemented surfaces of said lenses of said negative concentric meniscus are planes.

3. A Galilean-type telescope system as set forth in claim 1, wherein said cemented surfaces of said lenses of said negative concentric meniscus are spherical and have an equal radius of curvature, and are concave towards said eye side of said optical system.

4. A Galilean-type telescope system, according to claim 1, wherein said first component has a ratio of thickness in the optical axis to diameter not exceeding 1:10.

5. A Galilean-type telescope system, according to claim 1, wherein said first and second components comprise lenses with equal refractive indices and dispersion factors.

6. A Galilean-type telescope system, according to claim 1, wherein said objective of said telescope system has a positive focal distance, and said first and second components are spaced no more than 0.1 mm apart.

7. A Galilean-type telescope system, according to claim 1, wherein in each of said first and second components the radius of a rear refractive surface is greater than that of a front refractive surface, the radius of said front refractive surface of each of said first and second components being selected so that said front refractive surface has a focal power exceeding the focal power of the respective component, and the radius of said rear refractive surface of each of said first and second components being selected so that said components provide corrective properties.

8. A Galilean-type telescope system, according to claim 1, wherein the unconcentricity of the planes of cemented surfaces of the lenses of said third component does not exceed 20%, the difference in refractive indices of the lenses of said third component does not exceed 0.05, and the difference in dispersion does not exceed 20.

* * * * *